United States Patent [19]
Ohta

[11] Patent Number: 5,189,659
[45] Date of Patent: Feb. 23, 1993

[54] METHOD AND APPARATUS FOR RECORDING AND REPRODUCING INFORMATION BY INTERMITTENT LIGHT EMISSION FROM LASER LIGHT SOURCE

[75] Inventor: Shinichi Ohta, Tokyo, Japan

[73] Assignee: Canon Kabushiki Kaisha, Tokyo, Japan

[21] Appl. No.: 674,943

[22] Filed: Mar. 26, 1991

[30] Foreign Application Priority Data

Mar. 27, 1990 [JP] Japan .................................. 2-75383

[51] Int. Cl.⁵ .............................................. G11B 7/00
[52] U.S. Cl. .................................. 369/109; 369/44.34
[58] Field of Search ................. 369/109, 44.34, 44.11

[56] References Cited

U.S. PATENT DOCUMENTS

| | | | |
|---|---|---|---|
| 4,425,637 | 1/1984 | Tanaka et al. | 369/109 |
| 4,783,776 | 11/1988 | Ishigaki et al. | 369/109 |
| 4,799,791 | 1/1989 | Echizen et al. | 356/121 |
| 4,841,530 | 6/1989 | Chai et al. | 372/20 |
| 4,888,756 | 12/1989 | Shikichi | 369/124 |
| 4,935,913 | 6/1990 | Shinoda | 369/109 |
| 4,950,876 | 8/1990 | Saito | 235/476 |
| 5,008,552 | 4/1991 | Kuranochi et al. | 235/483 |
| 5,130,965 | 7/1992 | Karaki et al. | 369/109 |

*Primary Examiner*—Bruce C. Anderson
*Attorney, Agent, or Firm*—Fitzpatrick, Cella, Harper & Scinto

[57] ABSTRACT

An apparatus and a method for recording and reproducing an information signal onto an optical recording medium are disclosed. The apparatus includes a laser light source for radiating a laser beam onto the optical recording medium, a laser driver for driving the laser light source and a device for moving the medium relative to the laser beam. The laser driver controls the laser light source to selectively perform continuous light emission or intermittent light emission with a sufficiently higher frequency than that of the information signal during reproducing. By adopting the light intermittent emission of the light source, the formation of pits with some errors can be prevented and the reliability of the recording and reproduction can be enhanced.

41 Claims, 11 Drawing Sheets

METHOD AND APPARATUS FOR RECORDING AND REPRODUCING INFORMATION BY INTERMITTENT LIGHT EMISSION FROM LASER LIGHT SOURCE

BACKGROUND OF THE INVENTION

1. Field of the Invention

The present invention relates to method and apparatus for effecting at least one of the recording and reproduction of information, by irradiating an optical recording medium with a laser beam.

2. Related Background Art

In a conventional recording and reproducing apparatus, there has been generally used such a method that the power of a laser beam to be radiated onto an optical recording medium would be changed between upon recording and reproducing. That is, recording of information is effected by such a manner that light from a semiconductor laser is irradiated with an energy level sufficient to change the reflectivity at a portion where a light spot is irradiated, e.g., necessary for causing a dissolution. For reproducing information on the above recording medium, the light is irradiated from the semiconductor laser at a sufficiently low energy level not to change the reflectivity, in which the information was read out from changes of the reflected or transmitted light with the light spot tracing an information recorded portion. Therefore, an optical information recording medium is required to have a development characteristic with a distinct threshold as indicated by a dot-and-dash line a in FIG. 1. However, in practice, a recording medium with a dye system having significant durability in temperature and humidity has a characteristic as shown by a solid line b in FIG. 1, and it cannot satisfy the above-mentioned requirement. Note that FIG. 1 shows the applied energy density in the axis of the abscissa, and the change of reflectance in the axis of the ordinate, i.e., the formation of pits. As clearly seen from the figure, an actual characteristic curve indicates that the applied energy density during reproducing of information on a recording medium must be significantly small. If the reproduction of information is effected at an energy level with which any reflectance may be changed, as a result of accumulation of the changes, the reliability on the reproduction of information may be decreased, due to occurrence of reading errors.

Under such a limitation, the quantity of light incident upon a photodetector for detecting the change of light quantity will be naturally reduced. Therefore, it becomes difficult to detect an automatic focusing error signal (hereafter called an AF signal), an automatic tracking error signal (hereafter called an AT signal), and a reproduction signal.

Generally, when an optical disk is used as a recording medium, the pulling-in loop for the automatic focusing (AF) and the automatic tracking (AT), and the selection (access) of an information track are performed in a rotating state of the optical disk. Thereby, with an increased rotation speed, a portion of the light energy irradiated onto the recording medium can be effectively reduced. This is why if the light quantity of radiation is the same, the light energy density on a radiated portion of a moving medium is less than that of a medium in the stationary state. However, the setting of a rotation speed is largely restricted from the viewpoint of higher-density recording.

In particular, when a card-like optical recording medium (optical card) is used as a recording medium, the AT and AF pull-in operation, and the access operation are more preferably performed in the stationary state of the optical card, in order to maintain the reliability of attachment. However, it is difficult to prevent the radiation time of an optical spot from being longer. That is, the recording and reproducing are effected by reciprocating the optical card relative to a laser beam, in which the moving speed is naturally limited because of reducing the speed up to the stationary state at the end of the reciprocatory motion. In addition, when nothing is done, the optical card is placed in a stationary waiting state, in which AF and AT must remain operated. This is because, once AF and AT are made inoperable, it takes some time to loop in a servo mechanism again. And in this case, a light spot is applied to the same position for a long time, so that the applied energy density will be increased with the passage of time, thereby causing the change of reflectance. This will be described with reference to FIG. 1 in the following. In FIG. 1, a symbol $E_w$ indicates the applied energy density during recording for formation of pits, and $E_r$ the applied energy density at other states, i.e., the reproduction, the access, and the waiting states. The recording of a pit is made onto one position of an optical card in a short time. The variation in the medium with $E_r$ is very small. But as the reproduction of information is often repeated, thereby causing the variation in the medium to be accumulated, there is a fear that the information may be diminished during the repeated reproduction of information. Also, in the waiting state, as the light radiation is made on the same position for a long time, and so the variation in the recording medium is accumulated, pseudo pits may be formed. Accordingly, $E_r$ is desirably as small as possible.

By the way, the applied energy density is proportional to the emission intensity of a laser light source, for example, a laser diode, and the applied time on the same position of an optical card, and is inversely proportional to the area of a light spot on the optical card. Thus, it is conceived that the applied energy density is substantially reduced by changing the area of the light spot depending on the operation state. However, this method is difficult to use in practice, because an optical system must be activated in every state. Another method can be conceived in which the applied energy density is substantially reduced by increasing the recording speed. With this method, in recording the information, a medium must be given a sufficient applied energy density to form stable pits by increasing the emission intensity of the laser diode. In other words, a difference between the emission intensity during recording of a pit and that during other cases, e.g., the reproduction or the reading of AT and AF signals, must be increased. However, as is well known, the ratio of the emission intensity of the laser diode cannot be increased beyond a certain value. FIG. 2 shows a general characteristic of the light power to the input current of a laser diode. As clearly seen, the output of the laser diode is not the laser emission up to a threshold current $I_{TH}$, but is the LED emission. Only when the input current is above $I_{TH}$, does laser emission occur with the maximum rated light output $P_{MAX}$ obtained at $I_{MAX}$. That is, a range where the laser diode can be used as a laser light source is from $P_{MAX}$ to the light output $P_{TH}$ at $I_{TH}$. In a normal laser diode, the ratio between $P_{MAX}$ and $P_{TH}$ is at most about 20:1, and accordingly, in order to prevent the degradation due to the reproducing light, i.e., the variation in a recorded pit, it is necessary to suppress the light intensity on an optical card at $P_{TH}$ to a small value, by attenuating the intensity with the optical system. Correspondingly, as the light intensity on the optical card at $P_{MAX}$ is also attenuated, the recording speed must be reduced.

FIG. 3 shows that from a characteristic of variation in an optical recording medium as shown in FIG. 1, a light output characteristic of a laser diode as shown in FIG. 2, and a laser diode control signal, the variation in the recording medium for the above control signal can be derived. FIG. 3 shows the laser diode control signal in the fourth quadrant, with the time t being in the axis of the abscissa and the laser diode driving current I being in the axis of the ordinate. And it shows that the current I is transferred from a reproduction level $I_r$ to a recording level $I_w$, and again to $I_r$. When the light spot is scanning an optical card at an equal speed, the axis of abscissa t is equivalent to the distance x on the optical card. The third quadrant is a characteristic curve of a laser diode, where $I_r$, $I_w$ are equivalent to light intensities $P_r$, $P_w$, respectively. The second quadrant shows a recording medium characteristic, like in FIG. 1. Here, as the light intensity is proportional to the applied energy density with the same scanning speed and the same light spot area, $P_r$, $P_w$ become $E_r$, $E_w$, respectively, and $E_r$, $E_w$ become $D_r$, $D_w$ in the second quadrant, respectively. Accordingly, in the first quadrant, a graph can be obtained in which the distance x is indicated in the axis of abscissa, and the degree of variation in the recording medium in the axis of ordinate. As clearly seen from the figure, the variation corresponding to $D_r$ other than recording pits on the recording medium will be generated due to a small ratio of $P_w$ to $P_r$.

SUMMARY OF THE INVENTION

An object of the present invention is to provide method and apparatus for processing information, in which the problems of conventional technologies as above described can be resolved, and thereby the reliability of the recording and reproducing can be improved by preventing the formation of false pits.

The above object of the present invention is accomplished by an optical information processing apparatus for performing at least one of the recording of information signals onto an optical recording medium and the reproducing of the information signals from the optical recording medium, comprising:

a laser light source for radiating a laser beam onto said optical recording medium;

laser driving means for driving said laser light source, said laser driving means controlling said laser light source to selectively perform the continuous light emission or the intermittent light emission with a sufficiently higher frequency than that of said information signals; and means for moving said medium relative to the laser beam.

Further, according to another embodiment of the present invention, there is provided an apparatus for recording information signals onto an optical recording medium, and reproducing the information signals from the optical recording medium, comprising:

a laser light source for radiating a laser beam onto said optical recording medium;

laser driving means for driving said laser light source, said laser driving means controlling said laser light source to perform the continuous light emission during recording or the intermittent light emission with a sufficiently higher frequency than that of said information signals during reproducing; and means for moving said medium relative to the laser beam.

Also, based on the present invention, there is provided a method for recording information signals by radiating a laser beam onto an optical recording medium, and reproducing the recorded information signals, comprising steps of:

moving the medium relative to said laser beam;

forming pits indicating the information on the medium in a discrete format by continuously emitting the laser beam and modulating the laser beam in accordance with the information signals;

intermittently emitting the laser beam at a sufficiently higher frequency than that of the information signals, and scanning the pits formed on the medium by the laser beam; and detecting the laser beam modulated by said pits to reproduce the information signals.

According to a further embodiment of the present invention, there is provided a method for performing at least one of the recording and the reproducing of information signals on an optical recording medium having a plurality of tracks arranged in predetermined intervals, comprising steps of:

radiating a laser beam emitted intermittently at a sufficiently higher frequency than that of said information signals, onto the medium;

causing said laser beam to access one of said tracks;

moving the medium relative to the laser beam so that the laser beam scans one of said tracks; and performing at least one of the recording and the reproducing of the information signals on one of the tracks by continuously emitting said laser beam.

According to a still further embodiment of the present invention, there is provided a method for performing at least one of the recording and the reproducing of information signals on a card-like optical recording medium having a plurality of tracks arranged in parallel to each other, comprising steps of:

radiating a laser beam emitted intermittently at a sufficiently higher frequency than that of said information signals, onto one of said tracks;

reciprocating said medium relative to the laser beam, wherein the relative speed between the laser beam and the medium is accelerated at one end portion of a track, constant in a central portion of the track, and decelerated at the other end portion of the track; and performing at least one of the recording and the reproducing of the information signals on one of the tracks by continuously emitting the laser beam, when the relative speed between said laser beam and the medium becomes constant.

According to a still further object of the present invention, there is provided a method for performing at least one of the recording and the reproducing of information signals on a card-like optical recording medium having a plurality of tracks arranged in parallel to each other, comprising steps of:

radiating a laser beam emitted intermittently at a sufficiently higher frequency than that of said information signals, onto one of said tracks;

reciprocating said medium relative to the laser beam, wherein the relative speed between the laser beam and the medium is accelerated at one end portion of a track, constant in a central portion of the track, and decelerated at the other end portion of the track;

performing at least one of the recording and the reproducing of the information signals on one of the tracks by continuously emitting the laser beam, when the relative speed between said laser beam and the medium becomes constant;

stopping the relative movement between the laser beam and the medium while intermittently emitting the laser beam at a sufficiently higher frequency than that of the information signals;

causing the laser beam to access another track;

causing the laser beam to wait for the medium in a stationary state;

reciprocating again said medium relative to the laser beam, wherein the relative speed between the laser beam and the medium is accelerated at one end portion of a track, constant in a central portion of the track, and decelerated at the other end portion of the track; and performing at least one of the recording and the reproducing of the information signals on another track by continuously emitting the laser beam, when the relative speed between said laser beam and the medium becomes constant.

DETAILED DESCRIPTION OF THE PREFERRED EMBODIMENTS

Figure 1:
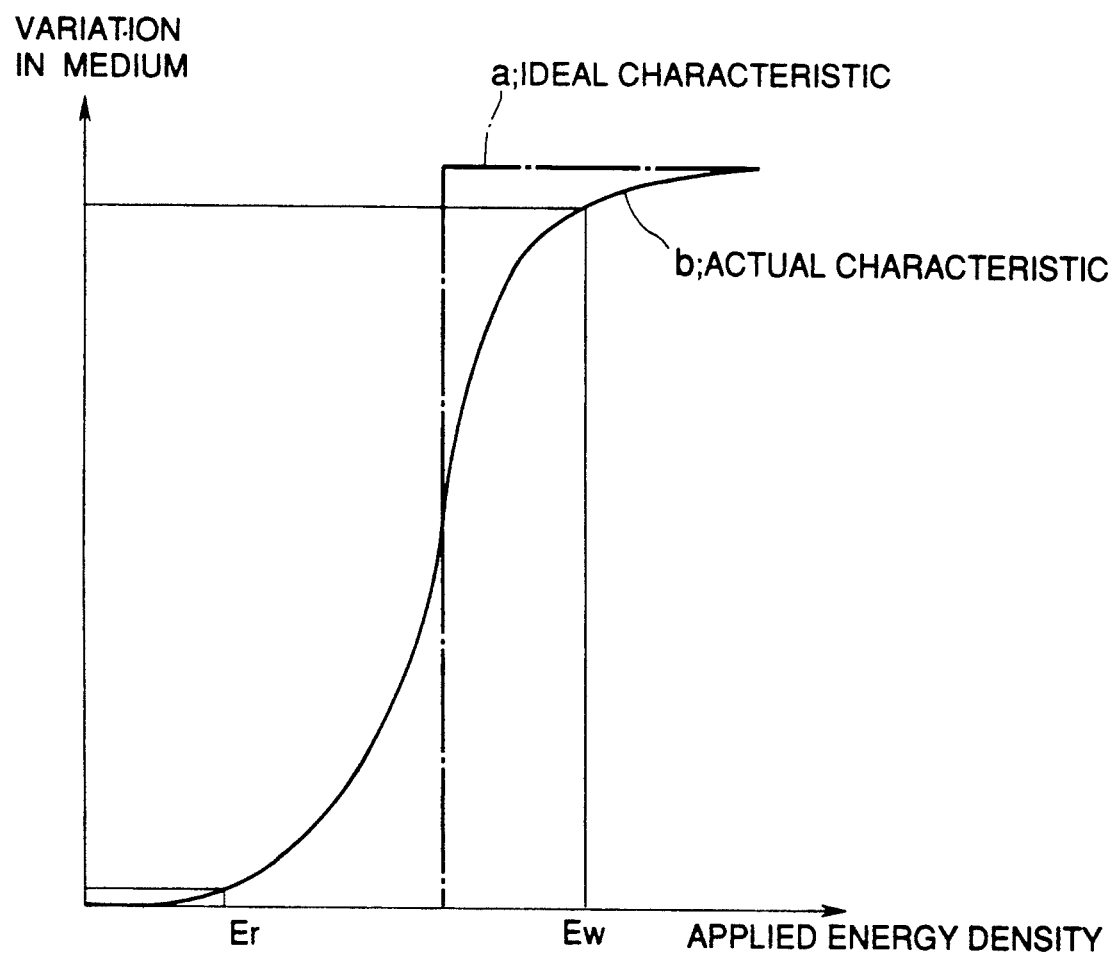
FIG. 1 is a view showing a recording characteristic of an optical recording medium.
Figure 2:
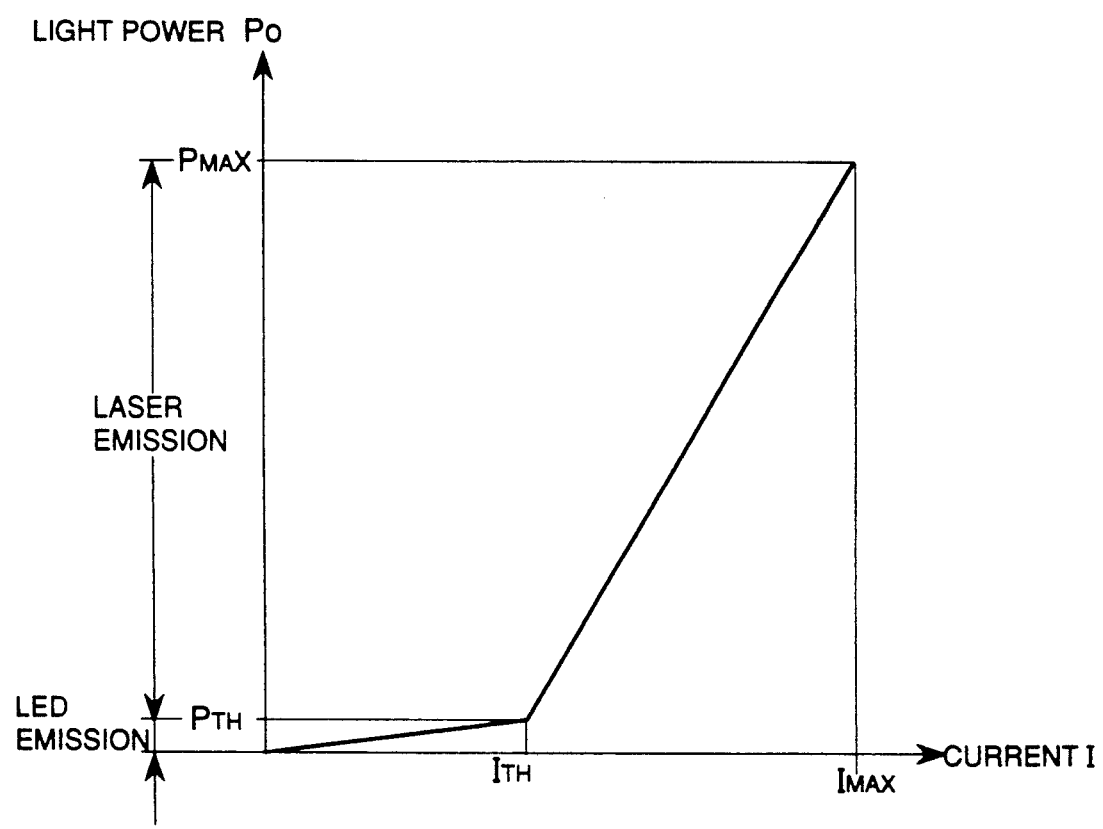
FIG. 2 is a view showing a light emission characteristic of a laser diode.
Figure 3:
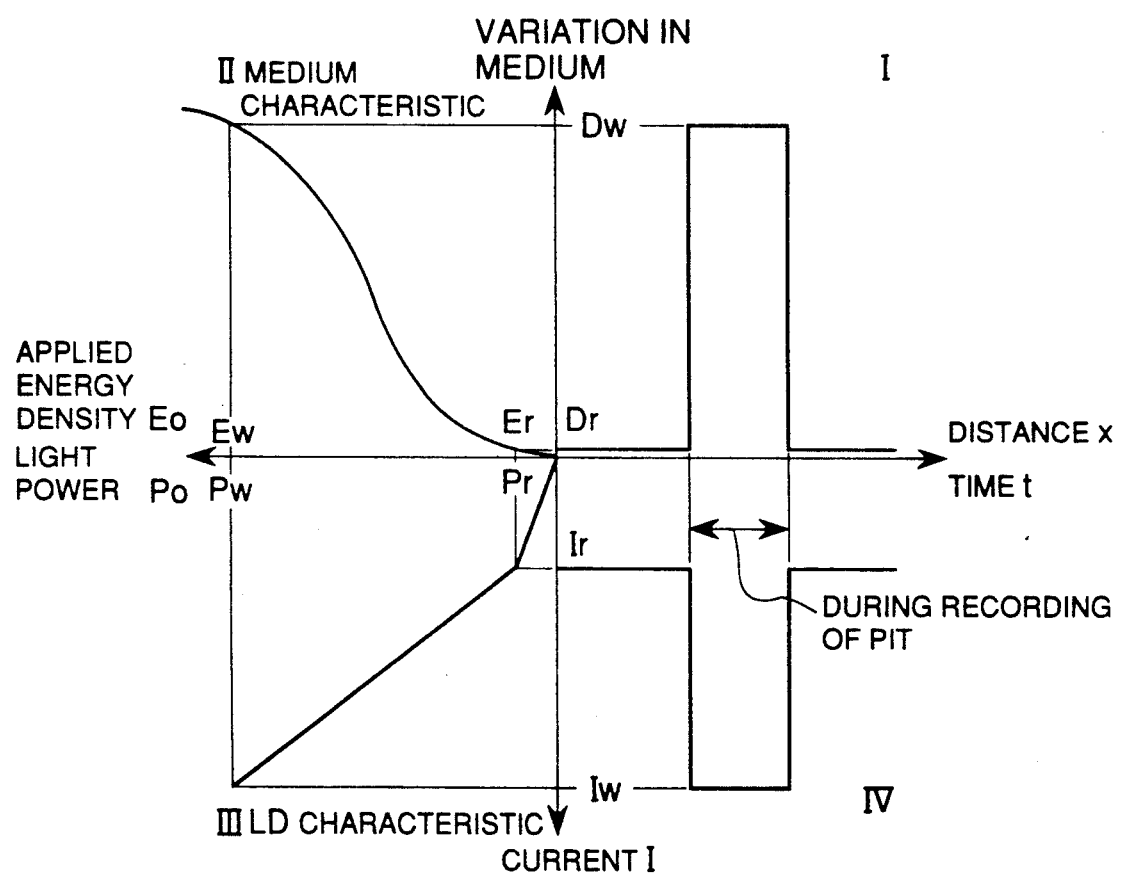
FIG. 3 is a view for explaining the relation between a control signal for a laser diode and the variation in the medium in a conventional recording method.
Figure 4:
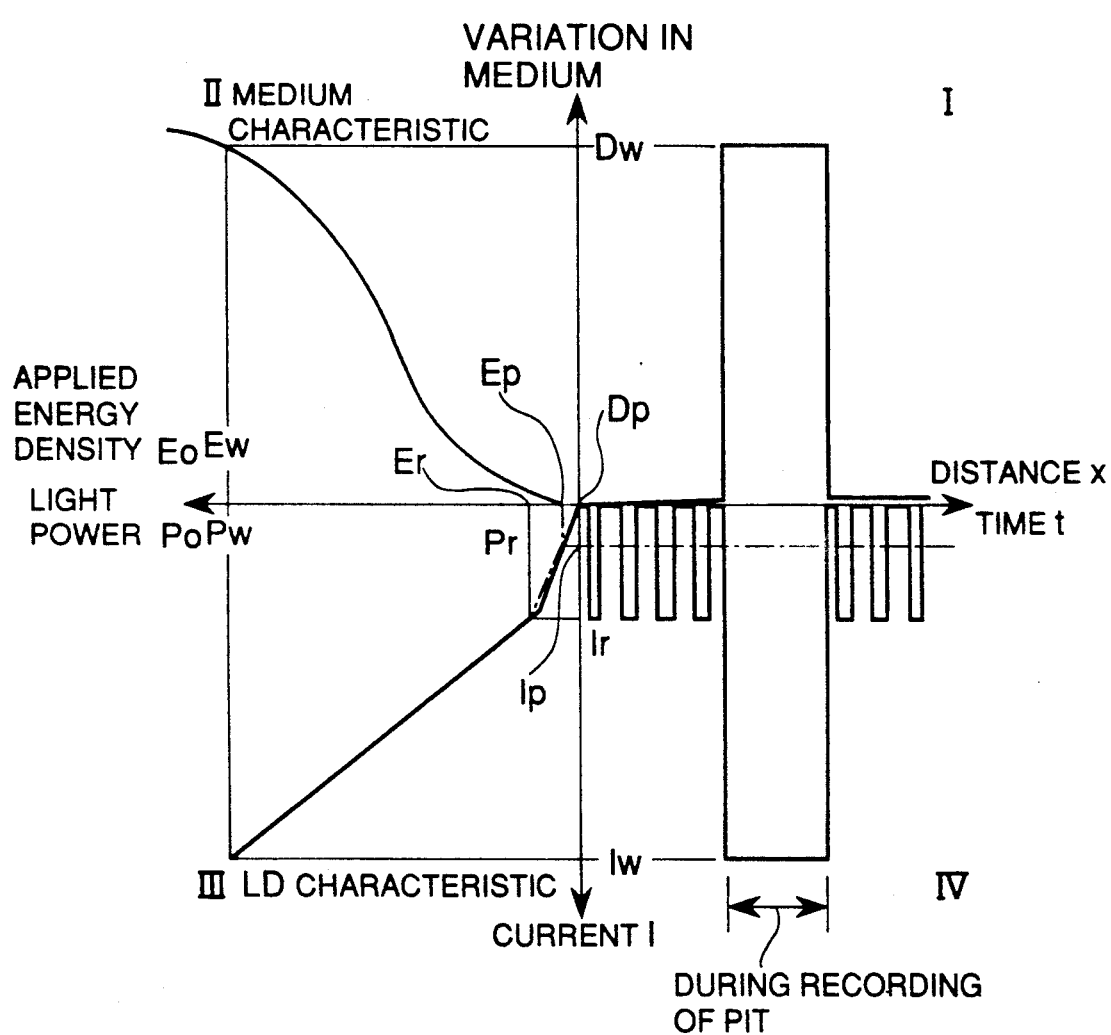
FIG. 4 is a view for explaining the relation between a control signal for a laser diode and the variation in the medium in a recording method according to the present invention.

FIG. 4 is a view for explaining the relation between a control signal for a laser diode and the variation in the medium in one example of a method according to the present invention. FIG. 4 shows a recording characteristic of a medium and a light emission characteristic of a laser diode in the second and third quadrants, respectively. These characteristics are the same as those for a conventional one of FIG. 3. The present example is characterized in that a laser light source is caused to intermittently emit the light during a period other than forming the pit, as shown in the fourth quadrant of FIG. 4. That is, in the present example, during the period other than forming the pit, the pulse current $I_r$ is supplied repeatedly to a laser diode at a very short frequency. During intervals between these pulses, the current will not flow through the laser diode. However, the current during this interval does not necessarily have to be zero. That is, even if a disordered light spot is radiated onto a recording medium by the laser light emission, no problem will occur if its light intensity is sufficiently low. In FIG. 4, if the current as above flows, the laser light emission $P_r$ and the extinction are repeated at times other than during recording of a pit. The applied energy density in this case is proportional to a duty ratio of the intermittent light emission.

That is, as shown in the figure, in a structure combined with a monitor photodetector PD, the back output light $P_b$ is detected by photodetector PD, and entered into the other input terminal of an operational amplifier 4. It is well known that the connection of the photodetector PD to the above input terminal and a feedback resistor $R_8$ form an automatic power control (APC) circuit which can compensate for a temperature characteristic of the laser diode. On the other hand, the output pulse from a pulse generator 2 has a duty ratio set to be a desired pulse width at a one-shot multivibrator 3, and controls a switch element $SW_3$ like the switch elements $SW_1$, $SW_2$ to turn on/off. But as the switch element $SW_2$ is off during recording of a pit, the current of the laser diode is not affected even if the switch element $SW_3$ may turn on/off. At times other than during recording of a pit, i.e. during reproducing, in AF, AT or the waiting state, the switch element $SW_1$ is off, the switch element $SW_2$ is on, and the switch element $SW_3$ works effectively. And when $SW_3$ is in the on state, the voltage $V_s$ is applied to the operational amplifier 4 at a division ratio between resistors $R_r$ and $R_t$, a current $I_r$ flows through the laser diode, so that a light output $P_r$ can be obtained. When the switch element $SW_3$ is off, the voltage $V_s$ is not applied to the operational amplifier 4, the current through the laser diode is zero, whereby on a two-dot chain line drawn from a position of $I_r$ to zero in the laser characteristic in the third quadrant, $I_p$ (dot-and-dash line) corresponding to $I_r$ divided by a duty ratio becomes an average applied energy density $E_p$. It is seen that the variation in the medium at this time is $D_p$, which is sufficiently smaller than that as shown in FIG. 3. In this way, according to the present invention, as long as there is no trouble in the reproduction of information, AF or AT, a larger applied energy ratio can be obtained with a less duty ratio of intermittent light emission.

Figure 5:
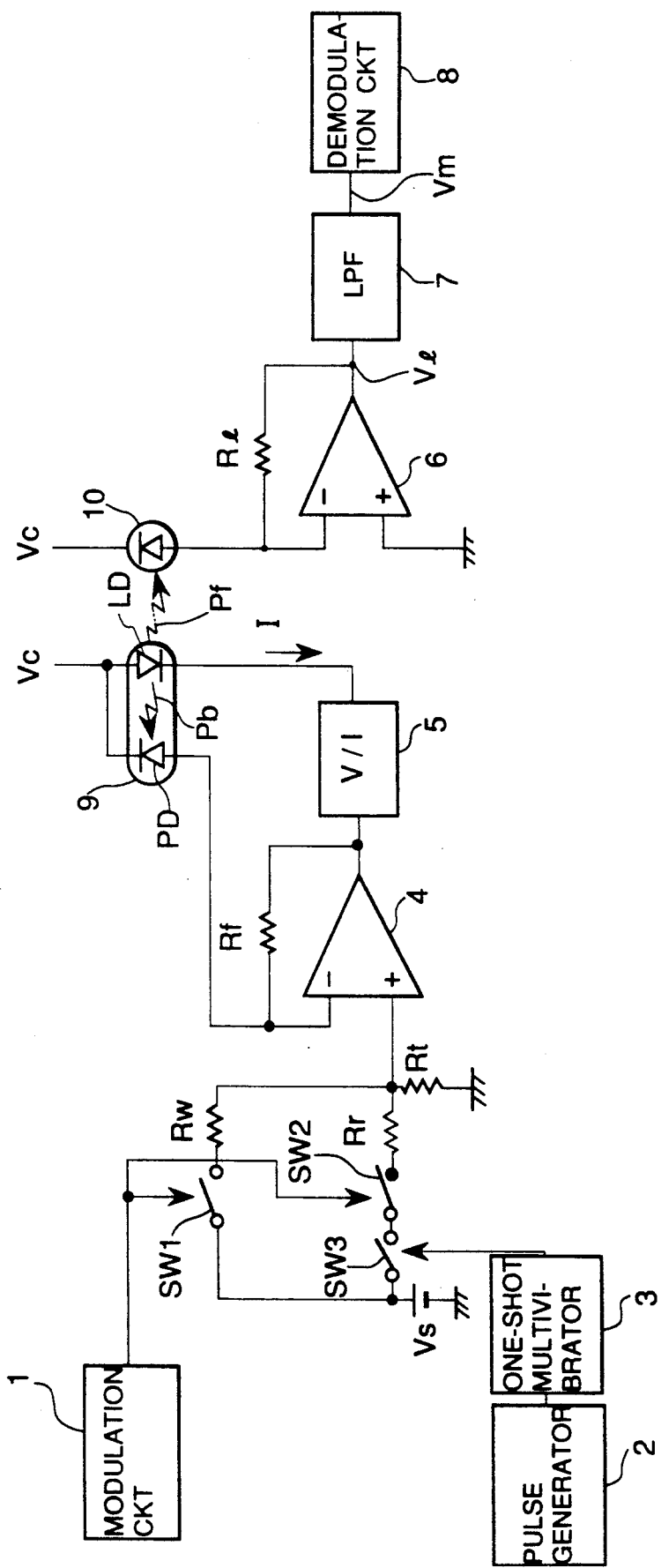
FIG. 5 is a block diagram showing one example of a laser driving circuit for use in an information processing apparatus according to the present invention.

FIG. 5 is a block diagram showing one example of a laser driving circuit for use in an information processing apparatus according to the present invention. The driving circuit controls the light emission of a laser diode (LD).

Numeral 1 is a modulation circuit used to modulate recording data into a pit signal. The pit signal as above mentioned controls the ON/OFF of switch element $SW_1$, $SW_2$ such as a field effect transistor (FET). During recording of a pit, if the switch element $SW_1$ is turned on, and the switch element $SW_2$ is turned off, a reference voltage $V_s$ is applied to one of the input terminals for the operational amplifier 4 at a proportional ratio between a resistor $R_w$ and a termination resistor $R_t$. The output of the operational amplifier 4 as above described is transformed into a current signal corresponding to the current $I_w$ as previously mentioned in a voltage-to-current transducer 5, which drives the laser diode to obtain the output $P_w$. Note that a recent laser diode has a zero light output at numeral 9. Thus, the laser diode (LD) is controlled for the intermittent light emission. Where $P_w > P_r$, $I_w > I_r$, and $R_w < R_r$. During reproducing of information, the laser diode intermittently emits the light, in which the front output light $P_f$ of the laser diode is radiated onto an optical card, and its reflected light is entered into a photodetector 10. The light current output from the photodetector 10 as above described is transformed into a voltage signal $V_1$ by means of a current-to-voltage transducer composed of a load resistor $R_1$ and an operational amplifier 6. And this signal has intermittent light emission components removed by a low-pass filter 7 to become a pit reproducing signal $V_m$, which is input into a demodulation circuit 8 for demodulating data.

Figure 6:
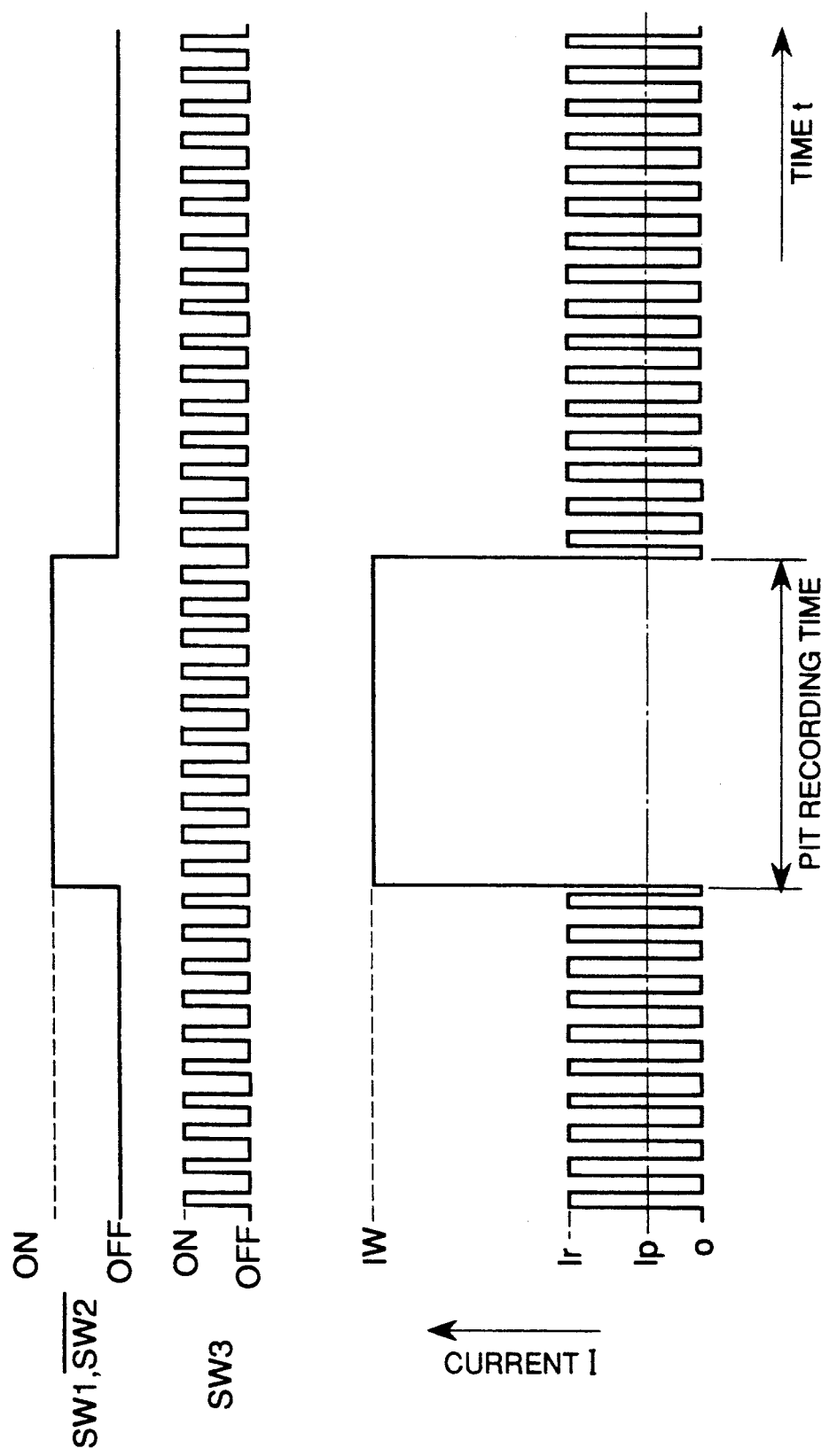
FIG. 6 is a diagram showing the signal waveform of each section in a circuit as shown in FIG. 5.

FIG. 6 shows a time chart for each operation in the circuit as shown in FIG. 5, wherein the relation between ON/OFF states of switch elements $SW_1$, $SW_2$, $SW_3$ and the LD driving current is illustrated.

Figure 7:
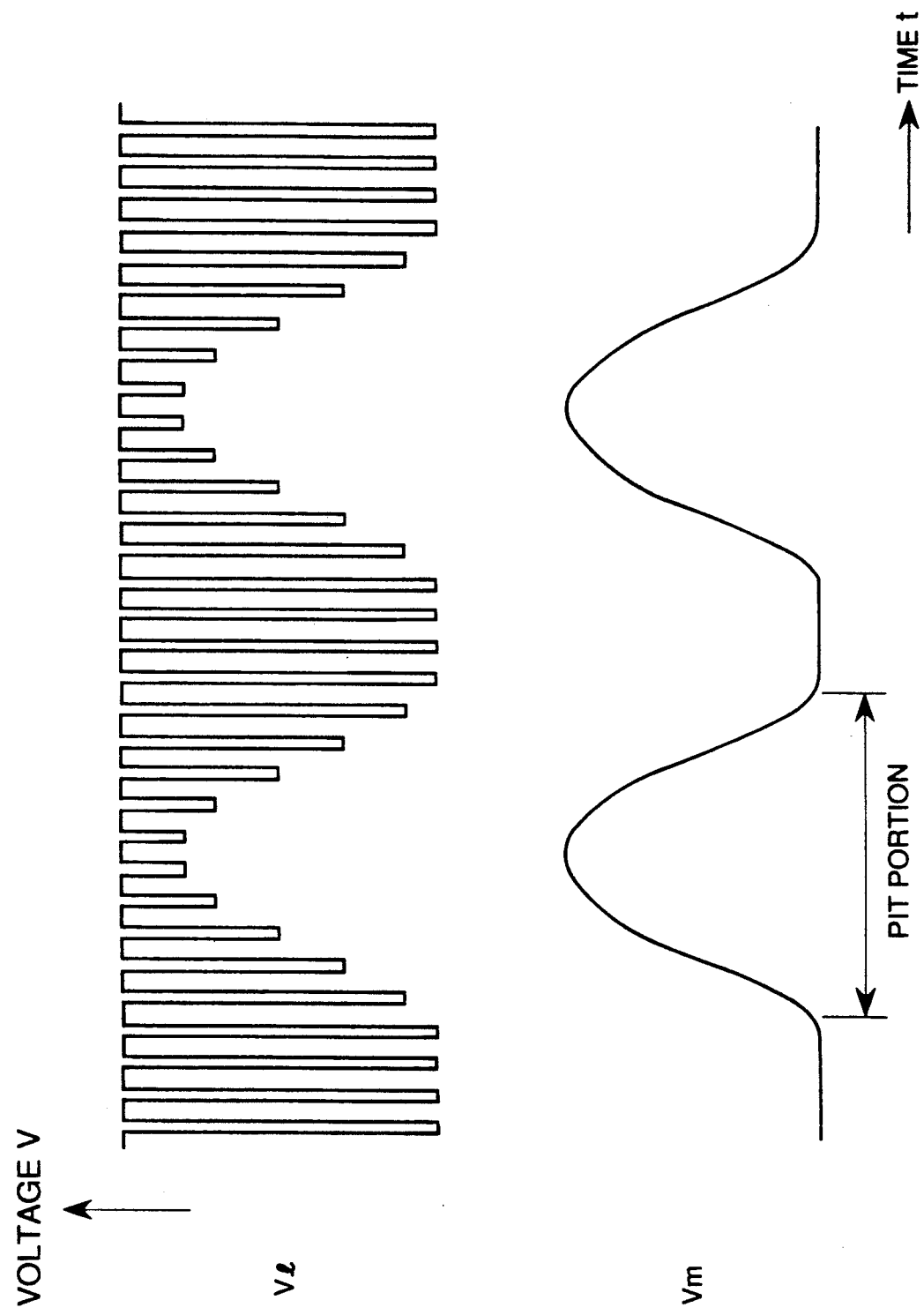
FIG. 7 is a waveform diagram of a reproduced signal in a method according to the present invention.

FIG. 7 illustrates a signal waveform showing the reproduction of a pit signal as shown in FIG. 5, wherein the relation between $V_l$ and $V_m$ is shown. If the low-pass filter 7 is a passive circuit, the amplitude of $V_m$ decreases corresponding to the duty ratio of $V_l$, whereas if it is an active circuit, any amplitude of $V_m$ is possible, and the duty ratio can be reduced up to a limit of the S/N ratio of signal. Further, in order to reproduce a pit signal more correctly than that in FIG. 7, it is sufficient to make the intermittent light emission frequency much higher than that of the pits.

Figure 8:
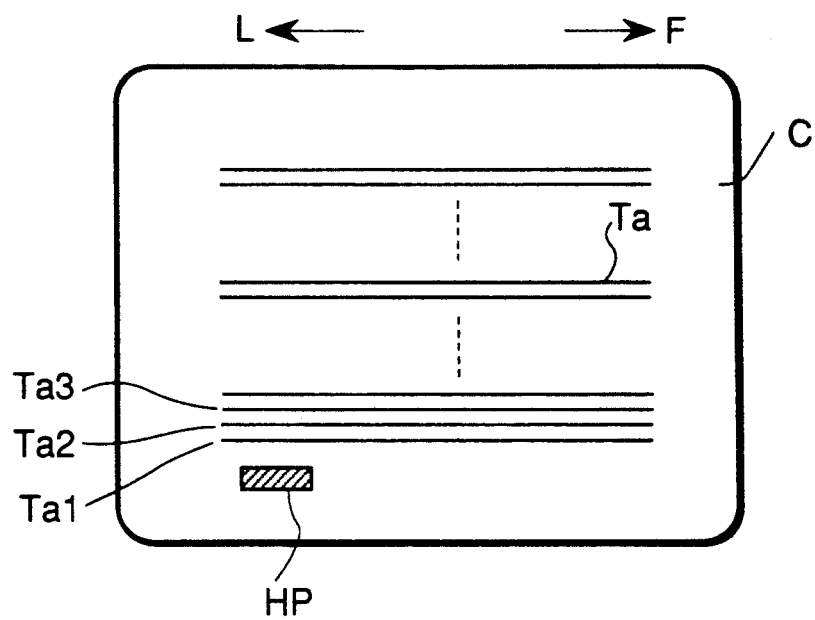
FIG. 8 is a schematic plan view showing one example of a card-like optical recording medium for use with the present invention.

FIG. 8 is a schematic plan view showing a constitution of an optical card for use with the present invention. In FIG. 8, on an information recording surface of the optical card C are arranged many information tracks $T_a$ in parallel extending in the LF directions. Also, on the information recording surface of the optical card C is provided a home position HP which is used for a reference position for the access to an information track $T_a$. The information tracks Ta are arranged in an order of $T_{a1}$, $T_{a2}$, $T_{a3}$, ... from near the home position HP, wherein they fall into two classes, the recorded information track in which the information has been recorded, and the unrecorded information track in which the information has not been recorded. The unrecorded information track can always store the information.

Figure 9:
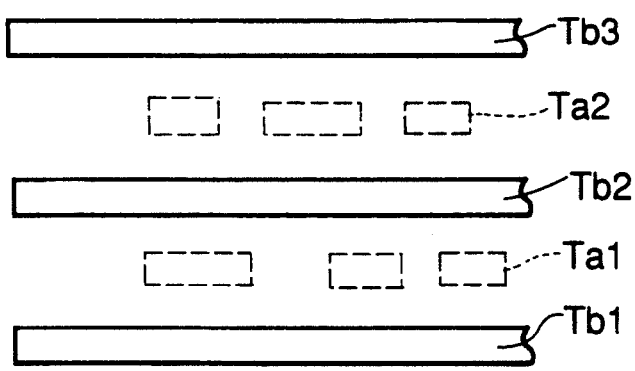
FIG. 9 is a partial expanded view of tracks of the medium as shown in FIG. 8.

Between information tracks $T_a$ is provided a tracking track $T_b$ as shown in FIG. 9. The tracking track $T_b$ is a guide for AT so that a light beam spot may not deviate from a predetermined information track in scanning of the light beam spot during reproducing of recorded information.

As a scanning method for the light beam spot, one in which an optical card is reciprocated is generally used. In this case, the optical card is singly moved, or moved together with a carrier mounting it.

Figure 10:
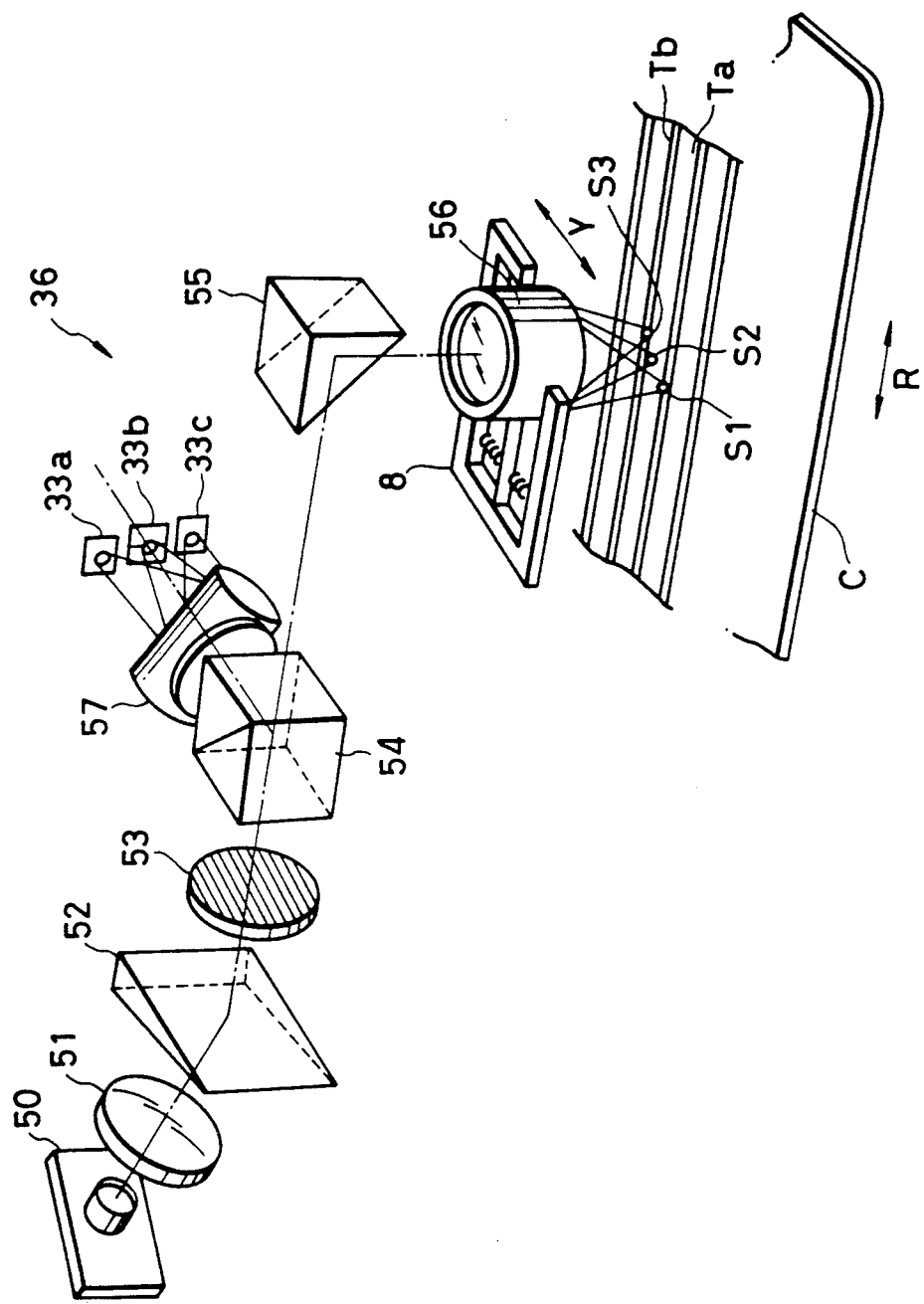
FIG. 10 is a schematic perspective view showing one example of an optical head for use in an information processing apparatus according to the present invention.

FIG. 10 is a schematic perspective view showing one example of an optical head for use in an information processing apparatus according to the present invention. In FIG. 10, a laser diode LD is indicated by numeral 50, in which a beam of light emitted therefrom is a divergent light beam, rendered a parallel light beam by a collimator 51, shaped into a predetermined distribution of light intensity via a light beam shaping prism 52, and entered into a diffraction grating 53. Here, three beams of light (zero-order diffracted light, ± first-order diffracted light) divided by the diffraction grating 53 as above described are incident onto a beam splitter 54, transmitted straight therethrough, and further reflected by a reflection prism 55, converged through an objective lens 56, and formed on an optical card C as three minute optical spots $S_1$ (corresponding to + first-order diffracted light), $S_2$ (corresponding to zero-order diffracted light, and $S_3$ (corresponding to − first-order diffracted light).

The light beam spots $S_1$, $S_3$ are positioned on adjacent tracking tracks, while the light beam spot $S_2$ is positioned on an information track between them. And the reflected light from the light beam spots formed on the optical card C is rendered a parallel light beam via the objective lens 56, reflected by the reflection prism 55, reflected by the beam splitter 54, converged by a converging lens system 57, and made incident onto each of photodetectors 33a, 33b, 33c (corresponding to the photodetector 10 as previously described). Thus, by analyzing AT from the photodetectors 33a, 33b and 33c, the tracking control is performed so that the light spot $S_2$ always scans on information track $T_a$.

In this case, if the direction of an information track on a recording medium does not coincide precisely with the moving direction of the recording medium and an optical head, the locus in scanning of the light beam spot may not be necessarily parallel to the information track. This phenomenon is generally represented as "there is a skew", in which if an AT servo is operated, the objective lens is moved in the Y direction along the information track $T_a$ within an actuator 8. However, owing to the structure of the actuator 8, its movement is limited to a range within ± several hundreds of $\mu$m. When the AT servo operates, a position of the objective lens 56 too deviated from a center will cause a great tracking error, and therefore, the movement of the objective lens should be about ±100 $\mu$m near the center in a possible range of the Y direction. Thus, if the position of the objective lens is further deviated from the center due to skew, the tracking should be continued by moving the actuator 8 carrying the objective lens in the Y direction, instead of moving the objective lens.

Figure 11:
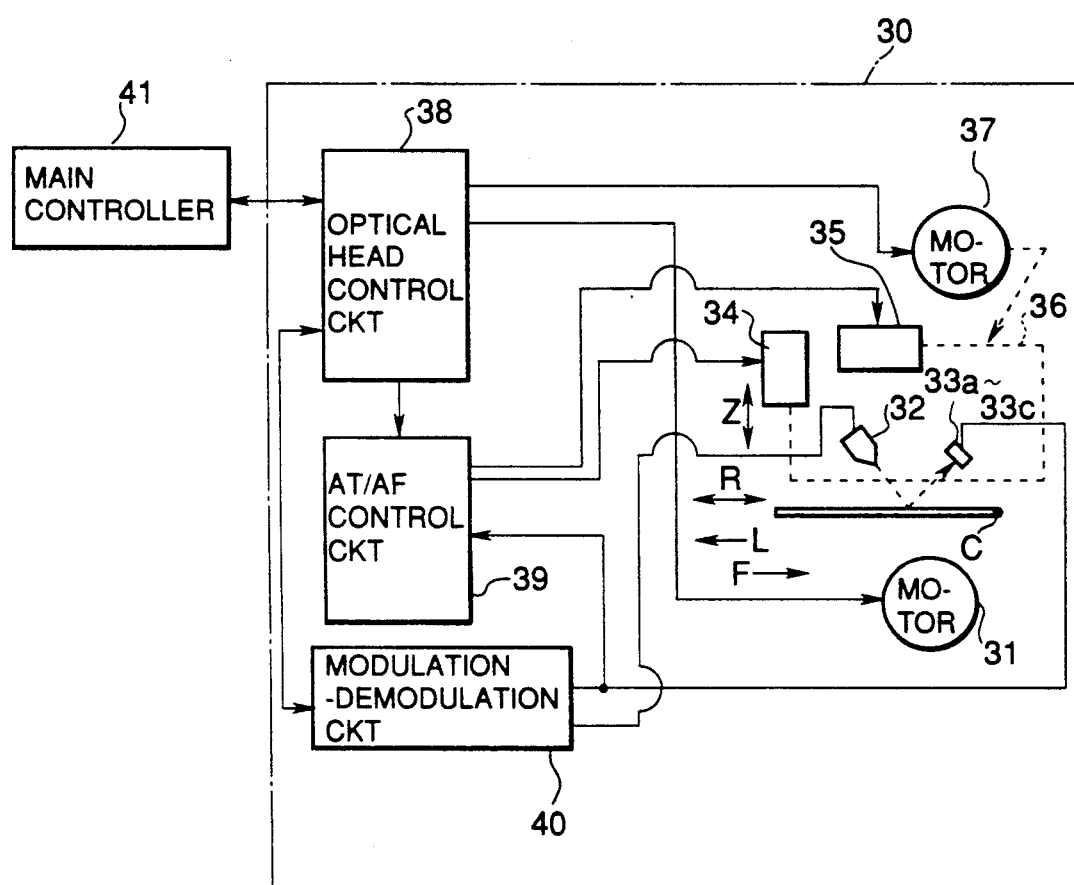
FIG. 11 is a block diagram showing one example of an information processing apparatus according to the present invention.

FIG. 11 is a block diagram showing one example of an information processing apparatus according to the present invention. In FIG. 11, a recording/reproducing apparatus indicated by numeral 30 is given a signal from a main controller 41. An optical card C is introduced into the recording/reproducing apparatus by a driving motor 31, and discharged outside of the apparatus after termination of the recording/reproducing. Onto the optical card C, a light beam spot is radiated from an optical system 32 with a constitution, as shown in FIG. 10, during recording or reproducing of information. Here, during recording or reproducing, three light beam spots are formed, and received by the photodetectors 33a–33c. An AF actuator 34 performs the AF by driving a part of light beam radiation optical system 32 and moving a focus position of the light beam spot on a surface of the optical card C in the Z direction. An AT actuator performs the AT by driving a part of light beam radiation optical system 32 and moving a focus position of the light beam spot on the surface of the optical spot C in the Y direction. A driving motor 37 moves an optical head 36 including the above-mentioned constitution in the Y direction, and causes the light beam spot to access a desired track on the optical card C within a seek time. These driving motors 31, 37 are controlled by an optical head control circuit 38. The outputs of the photodetectors 33a-33c are input into an AT/AF control circuit 39. The control circuit 39 controls the AF actuator 34 and the AT actuator 35 as above described to perform the AF and AT. Also, the outputs of the photodetectors 33a-33c are input into a modulation/demodulation circuit 40 which corresponds to a modulation circuit 1 and a demodulation circuit 8, to demodulate the read information. A demodulated signal is transmitted to the optical head control circuit 38, while the circuit 40 modulates an information signal transmitted from the optical head control circuit 38, and according to the modulated signal, the light beam radiation optical system 32 is driven to record the information.

Figure 12:
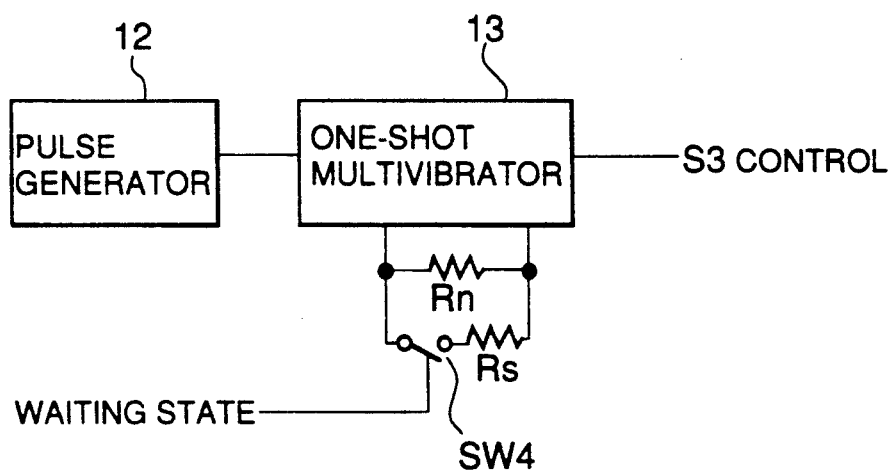
FIG. 12 is a block diagram showing another example of a laser driving circuit for use in an information processing apparatus according to the present invention.

FIG. 12 is a block diagram showing another example of a laser driving circuit for use in an information processing apparatus according to the present invention. The present example shows only a pulse generator unit in a driving circuit. Other units can be constituted in the same manner as those of FIG. 5. That is, the laser driving circuit of the present example can be obtained by replacing a pulse generator 2 and a one-shot multivibrator 3 as shown in FIG. 5 with those having a constitution as shown in FIG. 12.

The present example is one in which the duty ratio of the intermittent light emission for a laser diode is set at two stages. The output of pulse generator 12 is input into one-shot multivibrator 13. Here, a switching element SW₄ and a resistor R₅ are inserted in parallel to a resistor $R_n$ for determining a width of an output pulse from the one-shot multivibrator 13. And the switching element SW₄ as above described is turned on in the waiting state, making the width of the output pulse from the multivibrator 13 smaller, and the duty ratio smaller. In the waiting state, the information is not reproduced, but the AT and AF controls are preferably performed, and further, as a light spot remains at the same position of an optical card for a long time, the applied energy must be sufficiently small to avoid the degradation of reproduction. Therefore, this example has a much smaller duty ratio in the waiting state than that in other cases.

Note that in the example as shown in FIG. 5, a low-pass filter was used for the reproduction of a pit signal, but a sample-and-hold circuit can be effectively used in synchronization with a frequency of intermittent light emission. This is sufficiently presumed from $V_1$ in FIG. 7. But as a sample-and-hold circuit for high frequencies is expensive, a low-pass filter can be sufficiently substituted in practice.

Note that in these examples, the intermittent frequency on the intermittent light emission control as above described is sufficiently higher than the reproduced signal frequency obtained when the recorded information is reproduced, and preferably, sufficiently higher than a servo bandwidth frequency at which the focusing and tracking controls of a light spot on an information recording medium are performed as above described.

In the above examples, a semiconductor laser driving system controls the continuous light emission during recording, and otherwise controls the intermittent light emission. However, the present invention is not limited to the light emission control state of a semiconductor laser and the operation state of an optical information recording/reproducing apparatus, as above described. In the foregoing description, the variation in the recording medium in the reproducing state is shown in FIGS. 3 and 4, in which the relation between the second quadrant and the third quadrant in FIGS. 3 and 4 is not unique.

As previously described, the applied energy density varies with the scanning speed (radiation time) and the spot area, as well as the light intensity, and when reproducing the information, the condition is changed by the scanning speed, even with the same spot area. That is, if the scanning speed is fast, the radiation time is reduced, and a characteristic of the second quadrant as shown in FIGS. 3 and 4 shifts to the left with respect to the third quadrant, wherein $E_r$ becomes smaller than those as shown in FIGS. 3 and 4. Accordingly, when the scanning speed for reproduction is very fast, $E_r$, $D_r$ become much smaller even in the continuous light emission control, and repeated reproductions will not cause a medium to change. In this way, in various operation states of the optical information recording/reproducing apparatus, which operation state is possible in the continuous light emission control depends on a medium characteristic and an operation condition of an operation state.

The gist of the present invention is to prevent the degradation of a medium by making the intermittent light emission control when exerting some effect other than recording onto an optical recording medium, wherein the light emission state does not have to be substantially changed for the operation which will not cause the medium to degrade with the continuous light emission control.

Several examples of combinations between the operation states and the semiconductor laser light emission control states in an optical card recording/reproducing apparatus are shown in Table 1.

TABLE 1

| Operation | Combination | | | |
|---|---|---|---|---|
| state | 1 | 2 | 3 | 4 |
| Constant speed pit forming | Continuous | Continuous | Continuous | Continuous |
| Constant speed pit non-forming | Intermittent | Intermittent | Continuous | Continuous |
| Constant speed reproducing | Intermittent | Continuous | Continuous | Continuous |
| Head seeking | Intermittent | Intermittent | Intermittent | Continuous |
| Accelerating/ decelerating | Intermittent | Intermittent | Intermittent | Intermittent |
| Waiting | Intermittent | Intermittent | Intermittent | Intermittent |

In Table 1, the constant speed pit forming time in the column of operation state indicates a period during which the relative speed between a laser beam and a medium is constant, and the laser beam is at a position where a pit is formed on the medium. The constant speed pit non-forming time indicates a period during which the relative speed between a laser beam and a medium is constant, and the laser beam is at a position where a pit is not formed, i.e., between pits. The head seeking time indicates a period during which a motor 37 as shown in FIG. 11 moves a head 36 to cause a laser beam to access a desired track.

In the example of FIG. 11, as an optical card C is reciprocated by the motor 31, the relative speed between the laser beam and the card C is accelerated when the laser beam is located at one end portion of a track, made constant when the laser beam is located at a central portion of the track, and decelerated when the laser beam is located at the other end portion of the track. The accelerating/decelerating time as indicated in the column of operation state in Table 1 indicates a period during which the relative speed of a medium to the laser beam is accelerated or decelerated. And the waiting time indicates a period from the completion of a series of recordings or reproducings to the start of the next recording or reproducing. In the apparatus as previously described, the movement of an optical card to the laser beam is stopped during the waiting time, while the laser beam is radiated in a stationary state onto an end portion where the next recording or reproducing will be performed.

The combination 2 example as shown in Table 1 is the same as the combination 1 example in that the laser is caused to continuously emit the light during the constant speed pit forming time, and to intermittently emit the light during the constant speed pit non-forming time. But it differs from the combination 1 example in that the laser is caused to continuously emit the light during reproducing. In the combination 2 example, the emitted light power of the laser during reproducing needs to be set at a lower value than that during forming of a pit.

The recording and reproducing processes in the combination 3 example will be described with reference to FIGS. 10 and 11.

First, LD50 radiates the intermittently emitted laser beam onto a home position/HP on an optical card C. And the AT/AF control circuit 39 makes the AF pull-in, based on an AF signal detected by a photodetector 33b.

Next, the optical head control circuit 38 moves the optical head 36 in a direction orthogonal to the longitudinal direction of the track by the motor 37, thereby causing a laser beam to access a desired track. If the laser beam is radiated onto the desired track, the optical head control circuit 38 moves the optical card C in the direction as indicated by an arrow L by the motor 31. And if the relative speed between the laser beam and the optical card becomes constant, the laser driving circuit as shown in FIG. 5 causes the LD50 to emit continuously the light. Here, the power of the laser beam has been modulated in accordance with the information signal, and the pits representing the information are formed in a discrete format on a track. If the laser beam approaches an end portion of the track, the optical card is decelerated, and the LD50 is caused to emit the light intermittently again.

Next, the optical card C is moved in the direction as indicated by an arrow F by the motor 31. And if the relative speed between the laser beam and the optical card becomes constant, the LD50 is caused to emit the light continuously at a smaller power than that during recording, to trace the recorded pits with the laser beam. The reflected light of the laser beam which is modulated by the pits is detected by the photodetector 33b, and the modulation/demodulation circuit 40 reproduces the information signals from the output signals of photodetector 33b. If the laser beam approaches an end portion of a track, the optical card is decelerated, and the LD50 is caused to emit the light intermittently.

If the above process has been terminated, the optical head control circuit 38 drives the motor 37 to move the laser beam to another track. And until a next recording instruction is issued from the main control apparatus 41, the laser beam is caused to wait in the stationary state on another track. Meanwhile, the LD50 continues to emit the light intermittently.

If the next instruction is sent from the main control apparatus 41, the optical head control circuit 38 causes the motor 31 to drive for performing the recording or reproducing in the same process as above described.

The combination 3 example makes the recording and reproducing in such a way as above described. The combination 4 example also performs the recording and reproducing in the same way as the combination 3, except that the LD50 continuously emits the light during the head seeking, i.e., when the laser beam is moving between tracks.

Generally, the slower the relative speed between a medium and a laser beam is, the greater the possibility that a pit is falsely formed, so that the necessity of using the intermittent light emission more is caused. Accordingly, in the examples of Table 1, the combination 1 example is suitable to a case with the slowest relative speed, and the example is applicable to an apparatus with the faster relative speed, as drawing closer to the combination 4 example.

The present invention allows for various applications, in addition to the examples as above described. For example, in the example, an optical card is used as a medium, but the present invention is also applicable to an apparatus using any shape of medium such as disk or tape shape. The pit indicating an information signal may be formed in any manner, if it can be optically distinguishable from other portions. For example, normally, the pit is formed on a recess formed on the medium or a portion whose reflectance is changed, but the present invention is also applicable to one in which the pit is formed as a portion with a magnetized direction inverse to that in other portions, like an optical-magnetic recording medium. The present invention covers all such applications without departing from the scope of the appended claims.

What is claimed is:

1. An apparatus for recording information signals onto an optical recording medium and reproducing the information signals from the optical recording medium, comprising:

a laser light source for radiating a laser beam onto said optical recording medium;

laser driving means for driving said laser light source, said laser driving means controlling said laser light source to selectively perform the continuous light emission during recording and the intermittent light emission with a sufficiently higher frequency than that of said information signals during reproducing; and means for moving said medium relative to the laser beam.

2. An apparatus according to claim 1, wherein said medium has a plurality of tracks arranged in predetermined intervals, said apparatus further comprises access means for causing the laser beam to access one of these tracks, and said laser driving means controls the laser light source to intermittently emit the light during said access operation.

3. An apparatus according to claim 1, wherein said medium comprises a card-like optical recording medium having a plurality of tracks arranged in parallel to each other, said moving means reciprocates the medium so that the laser beam scans one of these tracks, wherein the relative speed between the laser beam and the medium is accelerated at an end portion of a track, constant in a central portion of the track, and decelerated at the other end portion of the track.

4. An apparatus according to claim 3, wherein said laser driving means causes the laser light source to intermittently emit the light when the relative speed between the laser beam and the medium is accelerated and decelerated.

5. An apparatus according to claim 3, wherein said movement means waits by stopping the movement of the medium relative to the laser beam, during a period from the termination of a series of recordings and reproducings to the start of the next recording and reproducing, and said laser driving means causes the laser light source to intermittently emit the light during the waiting time.

6. A method for recording information signals by radiating a laser beam onto an optical recording medium, and reproducing the recorded information signals, comprising the steps of:
moving said laser beam and the medium relatively;
forming pits indicating the information in a discrete format on the medium by continuously emitting the laser beam and modulating the laser beam in accordance with the information signals;
intermittently emitting the laser beam at a sufficiently higher frequency than that of the information signals, and scanning the pits formed on the medium with the laser beam; and
detecting the laser beam modulated by said pits to reproduce the information signals.

7. An apparatus for recording information signals onto an optical recording medium, and reproducing the information signals from the optical recording medium, comprising:
a laser light source for radiating a laser onto said optical recording medium;
a laser driving circuit for driving said laser light source, said laser driving circuit comprising a switching circuit to control so that said laser light source performs continuous light emission during recording or intermittent light emission with a sufficiently higher frequency than that of said information signals during reproducing; and
means for moving said medium relative to the laser beam.

8. An apparatus according to claim 7, wherein said medium has a plurality of tracks arranged in predetermined intervals, said apparatus further comprises access means for causing the laser beam to access one of these tracks, and said laser driving circuit controls the laser light source to intermittently emit the light during said access operation.

9. An apparatus according to claim 7, wherein said medium comprises a card-like optical recording medium having a plurality of tracks arranged in parallel to each other, said movement means reciprocates the medium so that the laser beam scans one of these tracks, wherein the relative speed between the laser beam and the medium is accelerated at an end portion of a track, constant in a central portion of the track, and decelerated at the other end portion of the track.

10. An apparatus according to claim 9, wherein said laser driving circuit causes the laser light source to intermittently emit the light when the relative speed between the laser beam and the medium is accelerated and decelerated.

11. An apparatus according to claim 9, wherein said movement means waits by stopping the movement of the medium relative to the laser beam, during a period from the termination of a series of recordings and reproducings to the start of the next recording and reproducing, and said laser driving circuit causes the laser light source to intermittently emit the light during the waiting time.

12. An apparatus according to claim 7, wherein said switching circuit comprises a first switch which opens or closes depending on an information signal during recording, and is made in an open state during reproducing, a second switch connected in parallel to said first switch, and made in an open state during recording and a closed state during reproducing, a pulse generator for generating a pulse signal, and a third switch connected in series to said second switch to open or close depending on the pulse signal issued from the pulse generator.

13. An apparatus according to claim 7, further comprising a photodetector for detecting the laser beam reflected by said medium, a low-pass filter for removing frequency components corresponding to a frequency of intermittent light emission from the output signal of said photodetector, and a demodulation circuit for reproducing the information signal from the output of said low-pass filter.

14. An apparatus according to claim 7, further comprising a servo circuit for performing at least one of tracking servo and focusing servo of said laser beam, the frequency of said intermittent light emission being sufficiently higher than that in a range of the servo frequency for the servo means.

15. An apparatus for recording and reproducing the information on an optical recording medium having a plurality of tracks arranged in predetermined intervals, comprising:
a laser light source for radiating a laser beam;
an optical system for focusing the laser beam emitted from said laser light source onto said medium;
a laser driving circuit for driving said laser light source, said laser driving circuit controlling said laser light source to perform continuous light emission during recording and intermittent light emission with a sufficiently higher frequency than that of said information signals during reproducing;
a first motor for moving said medium in the longitudinal direction of a track relative to the laser beam;
a photodetector for detecting the laser beam reflected from the medium; and
a demodulation circuit for reproducing an information signal from an output signal of said photodetector.

16. An apparatus according to claim 15, wherein said laser driving circuit comprises a voltage source for supplying current to the laser light source, a modulation circuit for supplying an information signal, a first switch provided between said voltage source and said laser light source, which opens or closes in accordance with the information signal supplied from said modulation circuit during recording, and is made in an open state during reproducing, a second switch connected in parallel to said first switch between said voltage source and said laser light source, and made in an open state during recording, and in a closed state during reproducing, a pulse generator for generating a pulse signal, and a third switch connected in series to said second switch between said voltage source and said laser light source, which opens and closes in accordance with the pulse signal issued from said pulse generator.

17. An apparatus according to claim 15, further comprising a control circuit for performing tracking control and focusing control of said laser beam, the frequency of said intermittent light emission being sufficiently higher than that in a range of the servo frequency for the servo circuit.

18. An apparatus according to claim 15, further comprising a low-pass filter provided between said photodetector and said demodulation circuit, for removing frequency components corresponding to a frequency of the intermittent light emission from the output signal of the photodetector.

19. An apparatus according to claim 15, further comprising an optical head mounting said optical system, and a second motor for causing the laser beam to access one of the tracks by moving the optical head in a direction orthogonal to the longitudinal direction of a track, and wherein said laser driving circuit controls the laser light source to intermittently emit the light during said access operation.

20. An apparatus according to claim 19, wherein said medium comprises a card-like optical recording medium having a plurality of tracks arranged in parallel to each other, said first motor reciprocates the medium so that the laser beam scans one of these tracks, and said apparatus further comprises an optical head control circuit for controlling the first and second motors, and wherein the optical head control circuit controls the first motor so that the relative speed between the laser beam and the medium is accelerated at an end portion of a track, constant in a central portion of a track, and decelerated at the other end portion of the track.

21. An apparatus according to claim 20, wherein said laser driving circuit causes the laser light source to intermittently emit the light when the relative speed between the laser beam and the medium is accelerated and decelerated.

22. An apparatus according to claim 21, wherein said optical head control circuit controls the first motor to stop the relative movement of the medium to the laser beam, during a period from the termination of a series of recordings and reproducings to the start of the next recording and reproducing, and said laser driving circuit causes the laser light source to intermittently emit the light while the relative movement of the medium to the laser beam is stopped.

23. An optical information processing apparatus for performing at least one of the recording of information signals onto an optical recording medium and the reproducing of the information signals from the optical recording medium, comprising:
    a laser light source for radiating a laser beam onto said optical recording medium;
    laser driving means for driving said laser light source, said laser driving means controlling said laser light source to selectively perform continuous light emission and intermittent light emission with a sufficiently higher frequency than that of said information signals; and
    means for moving said medium relative to the laser beam.

24. An optical information processing apparatus according to claim 23, wherein said apparatus forms pits indicating the information in a discrete format on the medium by radiating the laser beam modulated in accordance with the information signal onto the medium, and wherein said laser driving means causes the laser light source to continuously emit the light when the laser beam is located at a position where a pit is formed, and to intermittently emit the light at a sufficiently higher frequency than the frequency of the information signals when the laser beam is located between pits.

25. An optical information processing apparatus according to claim 24, wherein said apparatus reproduces the information by scanning the pits formed on the medium with the laser beam, and said laser driving means causes the laser light source to continuously emit the light during reproducing of information.

26. An optical information processing apparatus according to claim 23, wherein said medium has a plurality of tracks arranged in predetermined intervals, said apparatus further comprises access means for causing the laser beam to access one of these tracks, and said laser driving means controls the laser light source to continuously emit the light during recording and reproducing, and to intermittently emit the light during said access operation.

27. An optical information processing apparatus according to claim 23, wherein said medium comprises a card-like optical recording medium having a plurality of tracks arranged in parallel to each other, said movement means reciprocates the medium so that the laser beam scans one of these tracks, wherein the relative speed between the laser beam and the medium is accelerated at an end portion of a track, constant in a central portion of the track, and decelerated at the other end portion of the track.

28. An optical information processing apparatus according to claim 27, wherein said laser driving means causes the laser light source to continuously emit the light when the relative speed between the laser beam and the medium is constant, and to intermittently emit the light when the relative speed between the laser beam and the medium is accelerated and decelerated.

29. An optical information processing apparatus according to claim 28, wherein said movement means waits by stopping the movement of the medium relative to the laser beam, during a period from the termination of a series of recordings and reproducings to the start of the next recording and reproducing, and said laser driving means causes the laser light source to intermittently emit the light during the waiting time.

30. An optical information processing apparatus according to claim 29, further comprising access means for causing the laser beam to access one of said tracks, and said laser driving means controls the laser light source to continuously emit the light during said access operation.

31. An optical information processing apparatus for performing at least one of the recording of information signals onto an optical recording medium and the reproducing of the information signals from the optical recording medium, comprising:
    a laser light source for radiating a laser beam onto said optical recording medium;
    laser driving means for driving said laser light source, said laser driving means comprising a switching circuit for switching between continuous light emission and intermittent light emission with a sufficiently higher frequency than that of said information signals; and means for moving said medium relative to the laser beam.

32. An optical information processing apparatus according to claim 31, wherein said apparatus forms pits indicating the information in a discrete format on the medium by radiating the laser beam modulated in accordance with the information signal onto the medium, and wherein said laser driving means causes the laser light source to continuously emit the light when the laser beam is located at a position where a pit is formed, and to intermittently emit the light at a sufficiently higher frequency than the frequency of the information signals when the laser beam is located between pits.

33. An optical information processing apparatus according to claim 32, wherein said apparatus reproduces the information by scanning the pits formed on the medium with the laser beam, and said laser driving means causes the laser light source to continuously emit the light during reproducing of information.

34. An optical information processing apparatus according to claim 31, wherein said medium has a plurality of tracks arranged in predetermined intervals, said apparatus further comprises access means for causing the laser beam to access one of these tracks, and said laser driving means controls the laser light source to continuously emit the light during recording and reproducing, and to intermittently emit the light during said access operation.

35. An optical information processing apparatus according to claim 31, wherein said medium comprises a card-like optical recording medium having a plurality of tracks arranged in parallel to each other, said movement means reciprocates the medium so that the laser beam scans one of these tracks, wherein the relative speed between the laser beam and the medium is accelerated at an end portion of a track, constant in a central portion of the track, and decelerated at the other end portion of the track.

36. An optical information processing apparatus according to claim 35, wherein said laser driving means causes the laser light source to continuously emit the light when the relative speed between the laser beam and the medium is constant, and to intermittently emit the light when the relative speed between the laser beam and the medium is accelerated and decelerated.

37. An optical information processing apparatus according to claim 36, wherein said movement means waits by stopping the movement of the medium relative to the laser beam, during a period from the termination of a series of recordings and reproducings to the start of the next recording and reproducing, and said laser driving means causes the laser light source to intermittently emit the light during the waiting time.

38. An optical information processing apparatus according to claim 37, further comprising access means for causing the laser beam to access one of said tracks, and said laser driving means controls the laser light source to continuously emit the light during said access operation.

39. A method for performing at least one of the recording and the reproducing of information signals onto an optical recording medium having a plurality of tracks arranged in predetermined intervals, comprising the steps of:

radiating a laser beam which is emitted intermittently at a sufficiently higher frequency than that of said information signals, onto a medium;

causing said laser beam to access one of said tracks;

moving the medium relative to the laser beam to cause the laser beam to scan one of said tracks; and performing at least one of the recording and the reproducing of the information signal on one of tracks by continuously emitting said laser beam.

40. A method for performing at least one of the recording and the reproducing of information signals on a card-like optical recording medium having a plurality of tracks arranged in parallel to each other, comprising the steps of:

radiating a laser beam which is emitted intermittently at a sufficiently higher frequency than that of said information signals, onto one of said tracks;

reciprocating said medium relative to the laser beam, wherein the relative speed between the laser beam and the medium is accelerated at one end portion of a track, constant in a central portion of the track, and decelerated at the other end portion of the track; and performing at least one of the recording and the reproducing of the information signals on one of the tracks by continuously emitting the laser beam, when the relative speed between said laser beam and the medium is constant.

41. A method for performing at least one of the recording and the reproducing of information signals on a card-like optical recording medium having ga plurality of tracks arranged in parallel to each other, comprising the steps of:

radiating a laser beam which is emitted intermittently at a sufficiently higher frequency than that of said information signals, onto one of said tracks;

reciprocating said medium relative to the laser beam, wherein the relative speed between the laser beam and the medium is accelerated at one end portion of a track, constant in a central portion of the track, and decelerated at the other end portion of the track;

performing at least one of the recording and the reproducing of the information signals on one of the tracks by continuously emitting the laser beam, when the relative speed between said laser beam, when the relative speed between said laser beam and the medium is constant;

stopping the relative movement between the laser beam and the medium while intermittently emitting the laser beam at a sufficiently higher frequency than that of the information signals;

causing the laser beam to access another track;

causing the laser beam to wait for the medium in a stationary state;

reciprocating again said medium relative to the laser beam, wherein the relative speed between the laser beam and the medium is accelerated at one end portion of a track, constant in a central portion of the track, and decelerated at the other end portion of the track; and performing at least one of the recording and the reproducing of the information signals on another track by continuously emitting the laser beam, when the relative speed between said laser beam and the medium is constant.

* * * * *

UNITED STATES PATENT AND TRADEMARK OFFICE
CERTIFICATE OF CORRECTION

PATENT NO. : 5,189,659
DATED : February 23, 1993
INVENTOR(S) : Shinichi Ohta It is certified that error appears in the above-identified patent and that said Letters Patent is hereby corrected as shown below:

COLUMN 7

Line 34, "signal." should read --the signal.--.

COLUMN 9

Line 33, "into" should read --into a--.

COLUMN 12

Line 51, "the" should be deleted; and
    Line 52, "the" should be deleted.

COLUMN 18

Line 8, "of" (second occurrence) should read --of said--;
    Line 31, "ga" should read --a--; and
    Line 46, should be deleted.

Signed and Sealed this

Eighteenth Day of January, 1994

Attest:

BRUCE LEHMAN

*Attesting Officer*       *Commissioner of Patents and Trademarks*